Sept. 28, 1954     H. G. CROUCH ET AL     2,690,110
HITCH FOR SPIKE TOOTHED HARROWS
Filed Dec. 3, 1949     3 Sheets-Sheet 1
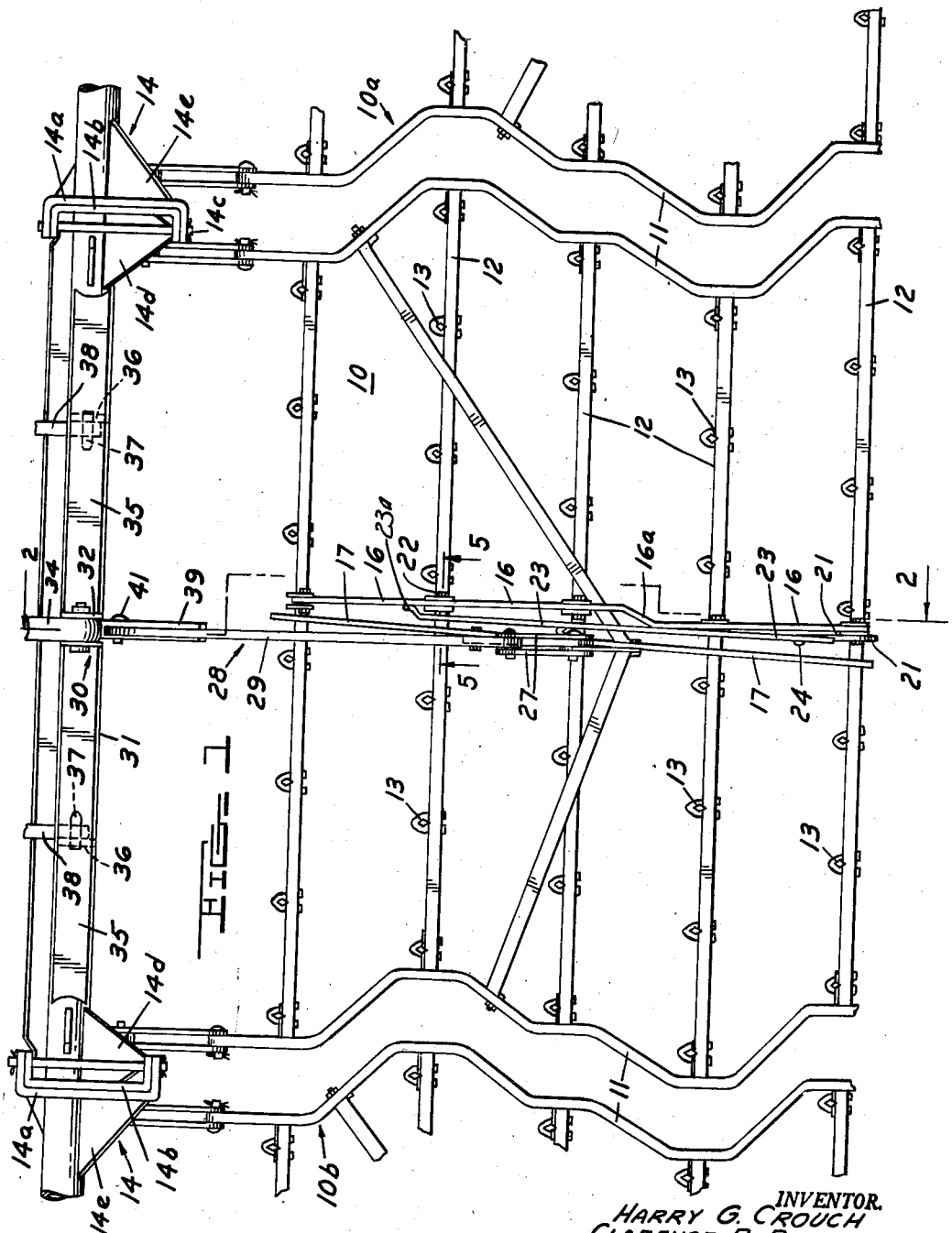
INVENTOR.
HARRY G. CROUCH
CLARENCE B. RICHEY
BY
ATTORNEY

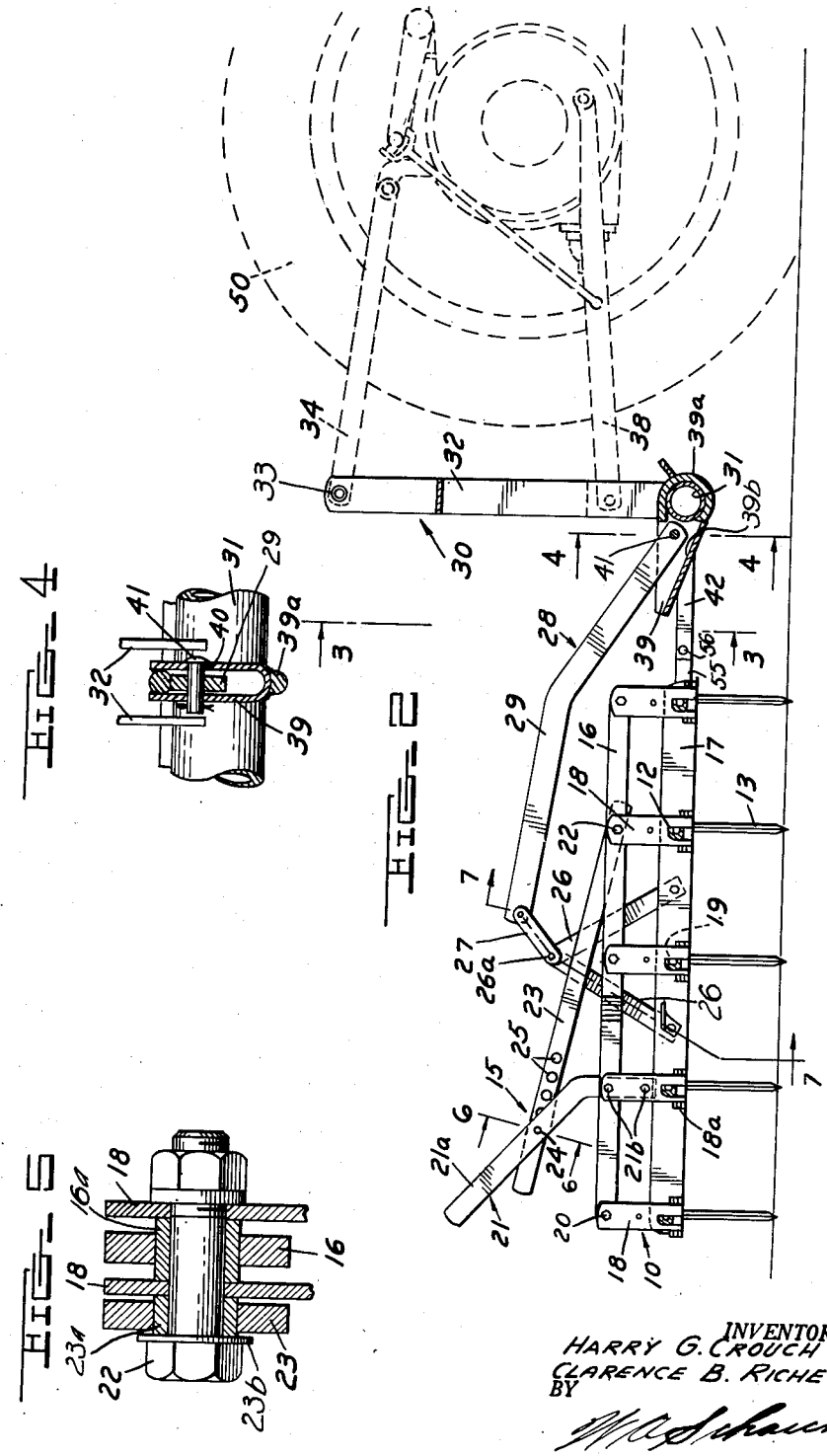

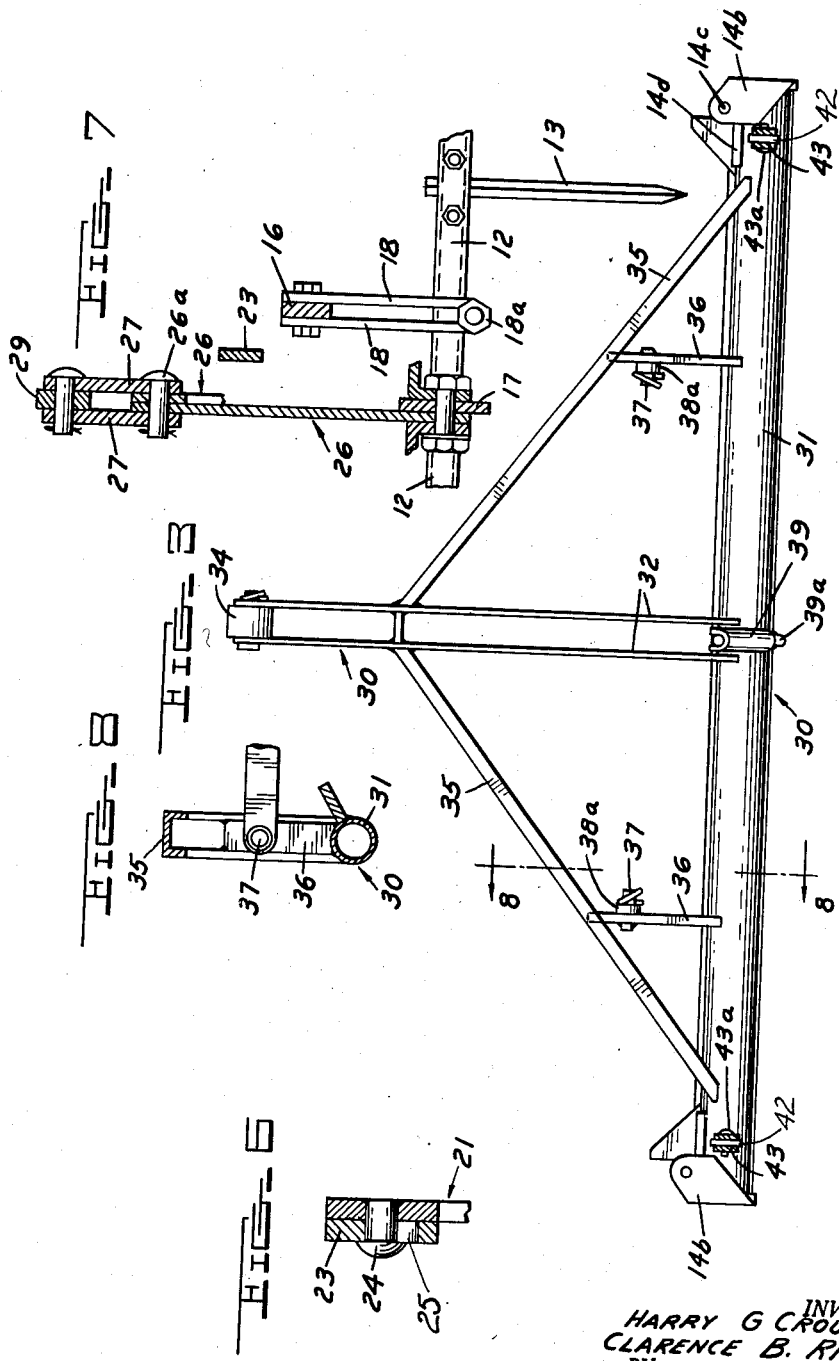

Patented Sept. 28, 1954

2,690,110

UNITED STATES PATENT OFFICE 2,690,110

HITCH FOR SPIKE-TOOTHED HARROWS

Harry G. Crouch, Detroit, and Clarence B. Richey, Royal Oak, Mich., assignors, by mesne assignments, to Ford Motor Company, Dearborn, Mich., a corporation of Delaware Application December 3, 1949, Serial No. 130,934

1 Claim. (Cl. 97—47.62)

This invention relates to improvements in a spike tooth harrow and more particularly to an improved arrangement for mounting of such a harrow to a tractor having vertically swingable, hydraulically operated hitch links.

Spike tooth harrows have been long used by farmers for smoothing the field after plowing or after discing, as a harrow of this type is particularly effective in breaking up clods of dirt and generally pulverizing and leveling the soil in preparation for planting. Such harrows are generally of substantial lateral extent in order to cover a large ground area with a minimum number of traverses by the tractor.

However, in trailing such a relatively large implement, the problem of mounting such implement on the tractor becomes somewhat difficult of solution due to its size, especially if such implement is to be transported to various locations in a raised position behind the tractor. Obviously, it is advantageous to transport an implement of this character in such a raised position, because then the ground-engaging elements are out of contact with the ground, thereby keeping such elements in a sharp condition and likewise preventing damage to paved roadways or grassed waterways.

Accordingly, it is an object of this invention to provide an improved spike tooth harrow construction particularly adapted for attachment to the hydraulically operated hitch links of a tractor.

Another object of this invention is to provide a mounting arrangement for a spike tooth harrow which is readily and quickly attachable to the hydraulically operated hitch links of a tractor and which is capable of supporting such harrow in a relatively rigid carrying position.

Still another object of this invention is to provide a linkage arrangement for a spike tooth harrow whereby such harrow may be floatingly connected to a tractor when in a working position, while allowing the harrow to be raised to a transporting position by the hydraulically operated vertically swingable hitch links of a tractor.

The specific nature of this invention, as well as other objects and advantages thereof, will become apparent to those skilled in the art from the following detailed description taken in conjunction with the attached drawings on which, by way of preferred example only, is illustrated one embodiment of this invention.

On the drawings:

Figure 1 is a plan view of the main central section of a spike tooth harrow constructed in accordance with this invention.

Figure 2 is a sectional view of the harrow taken along the plane 2—2 of Figure 1, showing the harrow in ground engaging position and connected to a tractor having hydraulically operable hitch links.

Figure 3 is a sectional view taken on the plane 3—3 of Figure 2.

Figure 4 is a sectional view taken on the plane 4—4 of Figure 2.

Figure 5 is a sectional view taken on the plane 5—5 of Figure 1.

Figure 6 is a sectional view taken on the plane 6—6 of Figure 2.

Figure 7 is a sectional view taken on the plane 7—7 of Figure 2.

Figure 8 is a sectional view taken on the plane 8—8 of Figure 3.

As shown on the drawings:

The central section 10 of a spike tooth harrow embodying this invention comprises essentially a pair of longitudinally extending, channel-shaped frame members 11 of zig-zag configuration spaced apart by a plurality of transversely disposed parallel spike tooth supporting bars 12. Each bar 12 is generally channel-shaped having a rounded exterior and is rotatably supported at each end by the frame members 11; furthermore, each of such bars is preferably spaced equidistantly from one another. A plurality of depending spike members 13 are secured on each of the bars 12 at equally spaced intervals. Spikes 13 on each adjacent bar 12, however, are so arranged as to provide a staggered relationship of the spikes as shown in Figure 1 to permit better coverage of the ground as the spike harrow is dragged thereover.

A plurality of harrow sections as above described may be pivotally secured together to provide a unit of substantially greater length. Such pivotal connection comprises a hinged joint as shown at 14 in Figure 1 provided at respective ends of tubular draw bar 31. Hinge 14 comprises an inner channel-shaped member 14b welded to the ends of bar 31 and stiffened by a gusset plant 14d welded respectively to bar 31 and inner hinge member 14b. A correspondingly shaped outer hinge member 14a is welded to the end of the draw bar of an adjacent harrow section 10a and 10b, such outer hinge member being likewise stiffened by a gusset 14c. The outer hinge 14a snugly surrounds inner hinge 14b and is pivotally connected thereto by a transverse pin 14c. The pivot point is located near the upper ends of the two hinge members 14a and 14b as shown in Figure 3, thus a substantial portion of the weight of sections 10a and 10b rests near the bottom of the hinge connection. Each section 10a and 10b may be readily pivoted about pin 14c for folding over the main harrow section 10 to reduce the over-all width of the implement when transporting the implement.

Spikes 13 disposed along bars 12 are readily adjustable from a vertical position as shown in Figure 1 to a sloped position (not shown) by a lever and linkage arrangement as shown at 15 whereby the depth of penetration of such spikes may be substantially reduced. Such arrangement comprises a horizontal bar 16 offset as shown at 16a in Figure 1 and maintained in spaced parallel relationship from a center support bar 17 by a plurality of links 18. The support bar 17 is provided with a plurality of spaced holes 19 which permit bars 12 to pass therethrough. Each link 18 is bifurcated in order to surround the respective bar 12 and is clamped thereto by a bolt 18a. The other end of each link 18 is pivotally connected to bar 16 by a rivet or bolt 20. A lever 21 provided with a rearwardly sloped handle portion 21a is secured to one of the links 18 by bolts or rivets 21b. Rotation of such lever in a clockwise direction as shown in Figure 2 forces bar 16 to move towards the right and each link 18 being pivotally secured thereto will be rotated correspondingly, thereby effecting rotation of bars 12 and hence rotation of spikes 13. The spikes 13 may be secured in any desired position of adjustment by a lock lever 23. Locking lever 23 is pivotally mounted on a bolt 22 utilized also to pivotally secure the pair of links 18 immediately rearward of the extreme front links to bar 16. A collar 16a surrounds bolt 22 and such collar is disposed between the links 18 to maintain such links spaced apart, bar 16 being mounted on collar 16a. Another collar 23a and a washer 23b surrounds bolt 22 between the head portion of such bolt and the adjacent link 18 thereby spacing such link from such head portion. Lever 23 is then mounted on collar 23a and washer 23b prevents the head portion of bolt 22 from binding against lever 23 while at the same time allowing pivotal movement of the lever 23 about collar 23a. A transverse headed pin 24 is provided in lever 21 as best shown in Figure 6 and such pin is selectively engageable with any one of a plurality of spaced holes 25 provided in lever 23.

The underside of the head of pin 24 is utilized to lock pin 24 in the selected position as shown in Figure 6, such head portion engaging the adjacent face of lever 23 to prevent the head from pulling through a selected hole 25. A spring tension is provided in lever 23 to maintain the engagement above described. Such spring tension is effected by providing an offset end portion 23a on lever 23 which is engageable with bar 16 slightly beyond the hinge point 22. Lever 23 contacts the offset portion 16a of bar 16 so that the rear end of lever 23 is forced slightly away from bar 16. Hence an appreciable force is required to bring lever 23 and lever 21 together sufficiently to permit engagement of headed pin 24 in hole 25. When the two levers are brought together as shown in Figure 6, a slight downward movement of lever 23 brings the uppermost surface of hole 25 into contact with the shank portion of pin 24 whereupon the head of such pin overlies the adjacent surface of lever 23 to frictionally secure such levers in the desired position of adjustment due to the lateral springing of lever 23.

Thus, spikes 13 may be locked in any desired position within the limits of movement of links 18. A corresponding spike adjusting mechanism is provided for each additional section of the harrow pivotally secured to the central harrow section.

In the center of main harrow unit 10 a pair of bars 26 are secured to spaced points on lower bar support member 17 and have their other ends secured by a pin 26a. A pair of parallel links 27 are pivotally secured to pin 26a, straddling arms 26 and are connected at their other ends to a cantilever type supporting arm or lever 28 as shown in Figure 1. Arm 28 comprises a substantially rectangular bar-like member having a downwardly bent end 29. Such arm is utilized to support spike harrow 10 in a raised transporting position as will be later described.

A substantially inverted V-shaped frame 30 is provided for carrying spike harrow 10. Such frame is adapted for mounting on the hydraulically operated hitch links 38 of a well-known type of tractor indicated at 50 and comprises a horizontal draw bar 31 of tubular construction which has a vertical strut 32 consisting of a pair of spaced rectangular bars centrally welded thereto. A transverse hole 33 is provided near the top of strut 32 to permit insertion of a pin therethrough so that the compression or top link 34 of the well-known three link implement lifting linkage of the tractor 50 may be pivotally secured thereto. Channel-shaped braces 35 are secured respectively to each end of support arm 31 and near the top of strut 32, preferably by welding. A pair of channel iron vertical struts 36 are disposed of strut 32 on bar 31 and equidistantly from each respective end to the bar 31 and are welded at each respective end to the bar 31 and respective brace 35. Each strut 36 supports a horizontally disposed projecting pin 37. The lower hitch links 38 of tractor 50 are mountable on pins 37 by the usual spherical type bearing (not shown) provided in the free end 38a of each hitch link 38.

A substantially radially disposed, rearwardly projecting, channel-shaped support 39 is horizontally welded to bar 31 and to a reinforcing ring 39a which partially surrounds bar 31 and is welded to such bar. Support 39 is centrally disposed on bar 31 in alignment with vertical strut 32. A transverse hole 40 is provided in support 39 in order that the forward end of cantilever arm 28 may be pivotally secured within the U portion of arm 39 by a pin 41.

The spike tooth harrow 10 is additionally trailingly and flexibly connected to draw bar 31 by a pair of transversely spaced connecting links 42. A bifurcated lug 43 is welded to opposite ends of draw bar 31, as best shown in Figure 3, and each link 42 is pivotally mounted within its respective bifurcated lug 43 by a transverse pin 43a. Each link 42 is in turn pivotally mounted within a bifurcated bracket 55 welded to the forward edge of the frame of harrow 10. A transverse pin 56 connects link 42 with bracket 55 as shown in Figure 2.

In a normal working position of the spike tooth harrow as shown in Figure 2, the hitch links 38 of the tractor are in the lowered position. When in such position frame 30 is in its lowermost position and the bight portion 39b of support 39 is not in contact with cantilever lever 28, thus the weight of the harrow 10 rests solely on the ground and the harrow may move vertically independently of the tractor, hence can follow ground irregularities. Adjustment of the vertical angular position of spikes 13 may be conveniently effected by rotating lever 21 in a clockwise direction as shown in Figure 2. Locking lever 23, however, must be raised slightly to permit lateral disengagement of headed pin 24 from one of the plurality of holes 25 in such locking member. When the spikes 13 are adjusted to the position desired, lever 21 is then locked by locking lever 23, the headed pin 24 being inserted through the selected hole in locking member 23.

When it is desired to raise harrow 10 to a transporting position, the hydraulically operated hitch links 38 are raised, which lifts frame 30 vertically. In so doing, the bight portion 39b of arm 39 contacts the underside of lever 28 when the frame 30 is raised slightly. Hence, as the frame is raised to a higher position, lever 28, being connected to harrow 10 through the medium of links 27, lifts harrow 10 from the ground to a transporting position. The end sections of the harrow may be manually folded to overlie the central section, the hinged joint at each end of bar 31 conveniently permitting such folding, thus the width of the harrow is substantially reduced for transporting purposes.

From the foregoing description, it will be readily apparent that there is here provided a harrow construction which can be conveniently and readily transported in an elevated position so that no damage will be done to either the harrow spikes or to any paved roadways or grassed waterways and yet without interference with the flexibility of the harrow in operation. The hitching arrangement used for connecting the spike tooth harrow to the vertically swingable draft links of the tractor is so simple that a minimum of time is lost in connecting or disconnecting the harrow from the tractor. The locking means utilized for securing the spikes in any selected position of adjustment is not only simple in design but positively locks the spikes where desired.

It will, of course, be understood that various details of construction may be varied through a wide range without departing from the principles of this invention and it is, therefore, not the purpose to limit the patent granted hereon otherwise than necessitated by the scope of the appended claim.

We claim:

An implement hitch for a tractor having a pair of vertically swingable, transversely spaced hitch links and a top link pivotally mounted on the tractor comprising in combination a frame, said frame including a horizontal draw bar and a vertical strut on said draw bar, means for attaching the free ends of the hitch links to said frame, means for connecting said top link to the upper end of said vertical strut, a rearwardly projecting lifting element on said draw bar, said lifting element having a generally U-shaped cross section, and a lever member pivotally mounted within said lifting element, the free end of said lever member being adapted for connection to a ground engaging implement, the bight portion of said U-shaped lifting element being constructed and arranged to contact said lever member when said frame is partially raised to form a rigid connection between said lifting element and said lever whereby said lever lifts the implement as said hitch links are raised.

References Cited in the file of this patent

UNITED STATES PATENTS

| Number | Name | Date |
|---|---|---|
| 1,540,549 | Earhart | June 2, 1925 |
| 1,913,069 | Chance | June 6, 1933 |
| 2,064,269 | Pope | Dec. 15, 1936 |
| 2,286,619 | Hokanson | June 16, 1942 |
| 2,321,516 | Robertson | June 8, 1943 |
| 2,336,152 | Rude | Dec. 7, 1943 |
| 2,444,321 | Woolridge | June 29, 1948 |
| 2,498,888 | Hyland | Feb. 28, 1950 |
| 2,551,870 | Bridger | May 8, 1951 |
| 2,591,028 | Udy | Apr. 1, 1952 |

FOREIGN PATENTS

| Number | Country | Date |
|---|---|---|
| 556,859 | Great Britain | Oct. 26, 1943 |
| 628,907 | Great Britain | Sept. 7, 1949 |